United States Patent
Zegler et al.

(10) Patent No.: US 6,228,479 B1
(45) Date of Patent: May 8, 2001

(54) PROCESS OF RECYCLING WASTE POLYMERIC MATERIAL AND AN ARTICLE UTILIZING THE SAME

(75) Inventors: Stephen A. Zegler, Cohutta, GA (US); Paul L. Weinle, Concord, NC (US)

(73) Assignee: Collins & Aikman Floorcoverings, Inc., Dalton, GA (US)

( * ) Notice: Subject to any disclaimer, the term of this patent is extended or adjusted under 35 U.S.C. 154(b) by 0 days.

(21) Appl. No.: 09/172,314

(22) Filed: Oct. 14, 1998

Related U.S. Application Data

(62) Division of application No. 08/826,431, filed on Mar. 18, 1997, now Pat. No. 5,855,981, which is a continuation of application No. 08/517,230, filed on Aug. 21, 1995, now abandoned, which is a continuation of application No. 08/193,801, filed on Feb. 9, 1994, now abandoned.

(51) Int. Cl.[7] ............................. B32B 5/16; B29B 17/00
(52) U.S. Cl. ...................... 428/327; 428/903.3; 428/323; 521/40; 521/45.5
(58) Field of Search .............................. 428/327, 903.3, 428/323; 521/40, 42, 43.5, 45.5

(56) References Cited

U.S. PATENT DOCUMENTS

| | | |
|---|---|---|
| 3,334,153 | 8/1967 | Fukushima et al. ............... 260/857 |
| 3,551,231 | 12/1970 | Smedberg ............................ 428/97 |
| 3,560,284 | 2/1971 | Wisotzky et al. ..................... 156/72 |
| 3,654,219 | 4/1972 | Boyer et al. ........................ 260/41.5 |
| 3,658,752 | 4/1972 | Das et al. ............................ 260/41.5 |
| 3,661,691 | 5/1972 | Slosberg . |
| 3,695,987 | 10/1972 | Wisotzky et al. ..................... 161/67 |
| 3,698,973 | 10/1972 | Wisotzky et al. ..................... 156/78 |
| 3,728,182 | 4/1973 | Wisotzky et al. ..................... 156/72 |
| 4,003,866 | 1/1977 | Paturle ............................. 260/17.4 R |
| 4,028,159 | 6/1977 | Norris ................................... 156/94 |
| 4,105,593 | 8/1978 | Stavrinou ............................. 260/2.3 |
| 4,105,709 | 8/1978 | Iwami et al. ....................... 260/2.857 |
| 4,158,646 | 6/1979 | Benkowski et al. .................. 260/2.3 |
| 4,250,222 | 2/1981 | Mavel et al. ......................... 428/285 |
| 4,359,556 | 11/1982 | Lakshmanan et al. ............. 525/420.5 |
| 4,371,576 | 2/1983 | Machell ................................ 428/92 |
| 4,437,918 | 3/1984 | Morohashi et al. .................. 156/322 |
| 4,808,459 | 2/1989 | Smith et al. ............................ 156/72 |
| 4,870,110 | 9/1989 | Mehra et al. ......................... 521/46.5 |
| 4,877,827 | 10/1989 | Van Der Groep ................... 524/477 |
| 4,968,463 | 11/1990 | Levasseur ............................ 264/40.1 |
| 4,988,764 | 1/1991 | Nishio et al. ........................... 525/66 |
| 5,010,138 | 4/1991 | Westeppe et al. .................... 525/183 |
| 5,112,908 | 5/1992 | Epstein ................................... 525/66 |
| 5,122,404 | 6/1992 | Fowler ................................... 428/87 |
| 5,122,569 | 6/1992 | Scheibelhoffer et al. .............. 525/66 |
| 5,217,655 | 6/1993 | Schmidt ................................. 264/22 |
| 5,240,530 | 8/1993 | Fink ...................................... 156/94 |
| 5,288,349 | 2/1994 | Fink ...................................... 156/72 |
| 5,294,384 | 3/1994 | David et al. ........................... 264/37 |
| 5,518,188 | 5/1996 | Sharer .................................... 241/14 |
| 5,535,945 | 7/1996 | Sferrazza et al. .................. 241/24.12 |
| 5,560,797 | 10/1996 | Burt et al. ......................... 156/244.19 |
| 5,578,357 | 11/1996 | Fink ...................................... 428/95 |
| 5,578,648 | * 11/1996 | Beyer et al. ......................... 521/45.5 |
| 5,598,980 | 2/1997 | Dilly-Louis et al. ............. 241/24.18 |
| 5,604,025 | 2/1997 | Tesch .................................. 442/394 |
| 5,728,444 | 3/1998 | Fink ...................................... 428/97 |
| 5,728,741 | 3/1998 | Zegler et al. ......................... 521/40 |
| 6,051,300 | 4/2000 | Fink ...................................... 428/95 |

FOREIGN PATENT DOCUMENTS

| | | |
|---|---|---|
| 2080259 | 4/1993 | (CA) . |
| 24 25 751 | 12/1975 | (DE) . |
| 40 14012A1 | 4/1990 | (DE) . |
| 0 511 469 | 11/1992 | (EP) . |
| 0590189A1 | 6/1994 | (EP) . |
| 0867557A2 | 3/1998 | (EP) . |
| 2 049 540 | 12/1980 | (GB) . |
| 60-206868 | 10/1985 | (JP) . |
| 3239754 | 2/1990 | (JP) . |
| 93/19654 | 10/1993 | (WO) . |

OTHER PUBLICATIONS

Malloy, R et al, Reclamation of Automotive Carpet Scrap, *AlchE*, Mar. 29, 1992.

Article "Recycling Nylon Carpet via Reactive Extrusion", Plastics Engineering, Apr., 1997.

Booklet "Book of Papers" used at 97 International Conference & Exhibition, Sep. 28–Oct. 1 by American Association of Textile Chemists and Colorists.

Article by Schnell "Material recycling of textile floor coverings", International Polymer Science and Technology, vol. 21, No. 3, 1994.

Article "Separation Process" (for carpets), Research Disclosure, 1996 p. 474.

Article "Recycling opportunities for unitary car carpeting systems", Melliand textileberichte, Mar. 1993 vol. 74, No. 3, p. 205–6.

1941417 95W–01542 "Automobile carpet backing" Published 1994.

1937670 94W–03844 "Polypropylene carpet backings for cars" Published 1994.

1936768 94W–02942 "Structure of the carpet and automotive textile markets taking into consideration the environmental considerations" Published 1993.

1938079 94W–04253 "Nonwoven carpets backing–issues and trends" Published 1994.

(List continued on next page.)

*Primary Examiner*—Blaine Copenheaver
*Assistant Examiner*—Cheryl Juska
(74) *Attorney, Agent, or Firm*—J. Michael Martinez de Andino; Hunton & Williams

(57) ABSTRACT

Articles of manufacture such as building materials are formed from recycled waste polymeric material including 15 to 50 percent aliphatic polyamide material. The articles are formed by chopping and granulating the waste polymeric material into fragments and extruding them at a temperature that is lower than the lowest melting point of the aliphatic polyamide material.

2 Claims, 3 Drawing Sheets

OTHER PUBLICATIONS 1951309 96W–04233 "Method of manufacturing a recyclable carpet" Published 1996.
1945489 95W–05614 "20 years Lutradur polyester spunbond backing" Published 1995.
1944861 95W–04986 "Unmixed polymer stitch–bonded fabrics for effective recycling solutions" Published 1994.
1946395 95W–06520 "Recycling of polypropylene carpeting waste" Published 1995.
1948151 96W–01075 "Recycling of polypropylene carpeting waste" Published 1995.
1943365 95W–03490 "Recycling of polypropylene carpeting waste" Published 1994.
1944572 95W–04697 "Recycling of carpeting and disposables wastes. II. Commercialization of processes" Published 1995.
1921814 92W–01086 "Multilayer polypropylene floor covering for automobiles" Published 1991.
123:57938 "Compatibilization of *automotive* *carpet* scrap (*recycling*)" Published 1995.
123:146004, "Sound emission analysis for characterizing fiber/polymer mixtures" Published 1994.
122:33044, "Material *recycling* of textile flooring. Continuation" Published 1993.
119:97802 "*Recycling* opportunities for unitary car carpeting systems" Published 1993.
125:169834, "Innovative products from post consumer nylon carpet via reactive extrusion" Published 1996.
970149, "Status on the *recycling* of automotive *carpeting*" Published 1997.
961029, "Development of mechanical and chemical recycling processing for automotive plastics parts" Published 1996.
5–48–2–6, "Recycling technology of automotive plastic parts" Published 1994.
125:331422, "Separation process (for carpets)" Published 1996.
126:132279, "Properties and applications of recycled polyamides" Published 1996.
116:175994, "A polypropylene sandwich for car floors" Published 1991.
R:580203 RAPRA, "*Automotive* Polymer *Recycling*" Published 1995.
97(12):3806 COMPENDEX "Use of post–consumer carpet products during landfill management of solid waste" Published 1996.
791083398, "Textile Reclamation in Britain: Some Recent Impacts on a Traditional Industry" Published 1978.
760747643, "New Markets Grown Fast in PP Fibre" Published 1976.
125:145027, "Manufacture of multilayer," *automobile* floor coverings with layers separable for * recycling* 1996 Ger. offen., 6 pp.
126:105318, "Improvements in *reclaiming* of natural and synthetic rubbers" 1997 Eur. Pat. Appl., 9 pp.
123:288831, "*Recycling* of *carpet* scrap"1995 PCT Int. Appl., 49 pp.
90:24935, "Reclaiming waste sheet flooring" 1997 U.S., 4 pp.
119:227933, "Extraction of pure polymeric components from multicomponent textile wastes using supercritical fluid method" 1993 U.S., 8 pp.
120:137055, "Fully recyclable tufted carpet from single class of thermoplastic polymers"1994 PCT Int. Appl., 20 pp.
121:302610, "Polyamide recovery from polyamide products by extraction" 1994 Eur. Pat. Appl., 6 pp.
120:219779, "Separation of nylon 6 from mixtures with nylon 66" 1994 U.S., 3 pp.
126:105155, "Polyurethane–based recyclable floor coverings" 1997 Ger., 3 pp.
125:60757 "Biodegradable solvent system for separation of rubber latex from solid surfaces, especially carpets" 1996 Ger. Offen., 2 pp.
124:237198, "Process for combined working up of PVC and other chlorinated hydrocarbons"1996 Eur. Pat. Appl., 11 pp.
123:341272, "Recovery of caprolactam from nylon 6 waste carpets" 1995 Eur. Pat. Appl., 16 pp.
125:144605, "*Reusable textile *floor* *coverings* for *automobiles*" 1996 PCT Int. Appl., 26 pp.
C95–112827, "Aliphatic polyamide recovery from waste materials e.g. carpet backing—by dissolving in anhydrous poly ol or carboxylic acid at high temp., filtering, and adding solvent to ppte, polyamide avoiding mol. wt. loss" 1995 3 pp.
N96–252901, "Recyclable laminated textile floor covering for *vehicles* has foam, release, dense and textile flooring layers with different adhesion to facilitate peel of foam or dense layer" 1996 EN 26 pp.
N95–091065, "Mainly homogeneous thermoplastic polymer blend made from carpet scrap—includes selected compatibilising agents giving useful prod. having desired properties" 1995 EN 50 pp.
C95–033524, "Recyclable carpets—obtd. by application of a compsn. ocontg. a block copolymer a non–aromatic plasticising oil, and a terminal, block compatible resin to the back of a carpet fabric" 1995 EN 28 pp.
C94–148255, Thermo formable composite article for e.g. carpet lining–obtd. by using nonwoven fabric formed from polyester fibre pile and backing of fibre blend comprising polyester and low melting co polyester 1994 EN 7 pp.
N96–217772, "Carpet fibrous and backing components recycling for high quality—by shredding, granulating, sepg. and returning polyethylene backing material to molding unit, for molded *automotive* carpeting waste" 1996 6 pp.
N97–044563, "Recyclable floor carpeting for *cars* with improved sound insulation—comprises upper part and base layer consisting of heavy layer sandwiched between two layers of non–woven fabric" 1997 10 pp.
C97–011247, "Process for reclaiming elastomer from sulphur cured material which can be directly used in molded goods, e.g. tyres—comprises treating material with mixt. of accelerators comprising essentially zinc di alkyl di thio phosphates and mercapto–benzo thiazole, etc., which maintains original physical and dynamic characteristics" 1997.
125:12898 "Improved *carpet* *reclamation* process" 1996 PCT Int. Appl., 20 pp.
C96–063496, "Carpet reclamation process—includes contacting carpet with compsn. contg. chemical softening agent for binder material in carpet and *separating* carpet pile from the backing(s)" 1996.
C96–050409, "Formation of a themoplastic compsn. from used carpet—without *separation* of polymeric components yielding a compsn. whose properties parallel those of virgin thermoplastic materials" 1994.

C–94–042142, "Process for producing thermoplastic composition by melt blending carpet—comprises melt blending a used unseparated carpet in a twin screw extruder to produce a thermoplastic composition" 1994.
C97–049304, "Recovery of monomer from multicomponent polymer waste—comprises heating mixt. of water and waste, cooling and * sepg* .liq. aq. soln., and recovering monomer" 1997.
C94–015898, "*Sepn* nylon 6 from mixts. with nylon 6,6—using solubility differencce in aq. aliphatic carboxylic acid, esp. acetic acid" 1994.
C93–087630, "Tufted *carpets* capable of being completely *recycled*—has backing, pile and adhesive made of same type of polymer and copolymer and heat–bonded" 1993.
C93–142243, "Recycling polymeric carpet compoment—using supercritical fluid at different temps. and pressures to dissolve and extract each component in turn" 1993.
N96–133636, "System for reclaiming and recycling waste carpet materials into carpet production—comprises shredder, granulator, *separator*, fibre storage unit, conveyors and delivery appts. and reduces cost of carpet, whilst improving backing quality" 1996.
C97–048684, "Process for recovering caprolactam from contaminated polyamide–6–by hydrolytic depolymerisation with water at elevated temp.,extracting from the resulting aq. soln. using alkylphenol and recovering from the extract by distn". 1997.
C97–047123, "Recycling polyamide–contg. carpet waste–by extn. with an agent contg. an aliphatic alcohol" 1997.
C97–028148, "Thermoplastic melt blend obtd. from non–*sped* ., used carpet samples—allows recycling, avoids polluting waste disposal, and provides material useful as a substitute for virgin thermoplastics" 1997.
C97–007578, "Tufted carpet which can be recycled by *sepn* . of components—has fibre tufts, substrate and adhesive between tufted prim. backing and substrate"1997.
N96–420398, "Even, wide–area recyclable carpet which is *removable* without unwished residues—has pile attached to base and underlay of textile weave or fleece *separable* from underside of base via *separation* layer" 1996.
N96–287254, "Recovery of polymeric fibres esp. nylon from tufted carpeting–by shredding and hammer milling with *sepn* . of backing and fibre fractions in several stages of air classification and screening followed by pelletisation or baling the fibres" 1996.
N95–281377, "*Separating* components of carpet material for recycling—by milling, suspending in water, adjusting liq. density with salf soln., and *separating* on the basis of density in a special centrifuge" 1995.
122:83210 "Reclaiming epsilon.–caprolactam from carpet waste" 1995.
C95–002936, "Reclaiming and purificn. of epsilon–caprolactam from carpet waste—comprising hydrogenating epsilon–caprolactam in the presence of hydrogen and a catalyst" 1995.
N94–249602, "*Recycling* plastic–contg. bonded fabrics, esp. *carpeting*—by shredding, compacting, crushing and kneading in a twin screw extruder, adding new material, homogenising and extruding the mixt." 1994.

C94–016585, "Elastic back layer prodn. for *carpet*, for improved consistency mixt.—by using *carpet* waste mixed with polyurethane binder and added old rubber granulate from tyres prior to and/or in binding phase for completed prod." 1994.
N93–158823, "*Carpeting* waste *recycling* —involves washing ground fine fibre waste to be convcerted into bonded nonwoven felting" 1993.
C92–184765, "Flat composite for *car* components—with thermoplastic matrix contg. *recycled* *carpet* backing, polypropylene and polyamide, and with glass fibre reinforcement" 1992.
C92–163129, "Textile flat *reusable* odourless material—comprises fibres strengthened by thermoplastic polyamide, for *floor* and wall covering and tufted *carpet*" 1992.
N89–271611, "Recovered material *car* *carpet* waste—is producted by reducing waste strips to coarse porous particles, mixing with polyurethane reagents, extruding and heating to cure" 1989.
78–86374A, "Thermoplastic fibre *carpet* waste recovery—effected by shredding waste into pieces, laying in layers, heating above m.pt., pressing and cooling".
125:170232, Hot–press moldings from *recycled* scraps from *automobile* floor *carpets* 1996.
125:18136*Recycling* of solid wastes 1996.
123:11198 "Manufacture of *automobile* interior flexible composite sheet from polypropylene *carpet* remnant" 1995.
121:233039, "Manufacture of synthetic fiber felts as backings for *automobile* *carpets*" 1994.
121:136373, "*Recyclable* *automobile* *carpets*" 1994.
104:70229 "*Recycling* of*carpet* scraps" 1986.
126:33000 "Sound–insulting felt backings for *carpets* with ultra low density" 1997.
125:170289, "Adhering sound insulation sheets to vehicular floor *carpets*" 1996.
125:60932 "Polyester–based fiber products with *recyclability*" 1996.
123:114800, "Chip moldings adhering to surface materials without adhesives and manufacture thereof for *automotive* interiors" 1995.
120:166001, "Manufacture of thermoplastic polymer compositions from *recycled* fibrous structures" 1994.
120:137067, "Sound– and heat–insulating two layered felt backings for *carpets* for *automobiles*" 1994.
113233063, "Manufacture of fire–retardant *recycled* polyurethane foam moldings" 1990.
C90–11863, "Flame retardant re bonded polyurethane foam prodn.—using foam chips mixed with thermally expansible graphite".
99:39508, "Sound–insulating laminates for *automobile* interiors" 1983.
99:6628, "Sound–insulating *automobile* floor linings" 1983.
126:75890 "Recyclable pile carpets with easy peeling of carpet base layer from binder layer and recycling thereof with high recovery of pile fiber" 1997.
124:262961, "Carpets and floor covering materials consisting of plastic backing, coating, and pile, and their manufacture and recycling" 1996.

C94–087840, "Bonded fibre mixed yarn based on wool and opt. other carpet fibre with melt bonding fibre and use in woven or knitted textile, esp. wall covering or carpet to increase yarn structure retention".

124:10448 "Molding of chips and sound insulators therefrom" 1995.

119:227945, "Manufacture of fibers from recycled polyester wastes" 1993.

100:140517, "Automobile floor coverings" 1984.

99:196761 "Automobile carpet backing" 1983.

99:106481 "Polyurethane–containing sound–insulating sheets" 1983.

* cited by examiner

PROCESS OF RECYCLING WASTE POLYMERIC MATERIAL AND AN ARTICLE UTILIZING THE SAME

CROSS REFERENCE TO RELATED APPLICATIONS

This is a division of application Ser. No. 08/826,431 filed Mar. 18, 1997, now U.S. Pat. No. 5,855,981, which is a continuation of application Ser. No. 08/517,230 filed Aug. 21, 1995, now abandoned, which was a continuation of application Ser. No. 08/193,801 filed Feb. 9, 1994, now abandoned. The present division application is also related to application Ser. No. 09/039,913 filed Mar. 17, 1998, which is a continuation-in-part of application Ser. No. 08/826,431 filed Mar. 18, 1997, now U.S. Pat. No. 5,855,981 of which the present application is a division. The present application is also related to application Ser. No. 08/897,264 filed Jul. 18, 1997, now U.S. Pat. No. 5,914,353, which is a continuation-in-part of application Ser. No. 08/664,954 filed Jun. 13, 1996, now U.S. Pat. No. 5,728,741, which was a continuation of application Ser. No. 08/517,571 filed Aug. 21, 1995, now abandoned, which was a division of application Ser. No. 08/193,801, now abandoned.

BACKGROUND AND FIELD OF THE INVENTION

The present invention relates to recycling and reclaiming waste polymeric material, and forming an article therefrom, and more particularly forming a floor covering utilizing the recycled and reclaimed waste polymeric material.

There has been an increased interest in recycling, reclaiming and reutilizing waste and scrap material, and particularly waste thermoplastic polymeric material from a variety of sources. The recycling of most mixtures of thermoplastic scrap material is limited by the incompatibility of the various different kinds of thermoplastic material present in the scrap. For example, the various thermoplastic resins are often insoluble in each other resulting in a heterogeneous mixture in which each type of resin forms a dispersed phase in the other. This often results in adversely affecting the mechanical properties (e.g., tensile and impact strength) and aesthetic properties of any articles formed from such a mixture.

One suggestion to overcome this problem is to sort the scrap material based on the specific thermoplastic material present. Such sorting, however, is impractical from both a technical and economic standpoint. Thus various other solutions have been proposed with respect to recycling waste polymeric material. For example, U.S. Pat. No. 4,250,222 to Mavel et al. proposes coarsely grinding a mixture of two or more mutually incompatible thermoplastic resins, incorporating into the coarsely ground thermoplastic resin mixture, through the application of heat and pressure, from about 5 to about 25 parts by weight of a fibrous material, and forming the resin/fiber mass into an article.

U.S. Pat. No. 4,968,463 to Levasseur proposes shredding or granulating polymeric waste, drying the material to a water content of not more than 8% by weight, preheating the material to a temperature of 80° C. to 160° C., kneading at a temperature of 120° to 250° C. and injection molding or extrusion of the material to form a product such as a fence post.

Processes for recycling floor covering have also been desired inasmuch as a particularly large amount of scrap material is generated during the manufacture of floor covering. For example, in the manufacture of tufted carpet, the tufted carpet may have nylon pile secured in a primary backing of a woven polypropylene fabric which has a secondary vinyl plastic backing. The pile, the primary backing and secondary backing are typically each a thermoplastic having different characteristics.

Specific to recycling carpet, U.S. Pat. No. 4,028,159 to Norris proposes a process for reclaiming selvedge formed during manufacturing. The process comprises heating the selvedge in air to a temperature above the melting points of the resins to melt and degrade the resins; separating melted resin from solid residue to reclaim meltable resin from the selvedge; and utilizing the reclaimed resins as a substitute for at least a portion of the high molecular weight resins in an adhesive mixture in subsequent carpet production.

U.S. Pat. No. 4,158,645 to Benkowski et al. proposes applying a shearing force (e.g., using a Banbury mixer) to tear the fabric fibers into lengths no greater than about 0.25 inch. This forms a mixture of thermoplastic resin and short lengths of fabric fibers. The resulting mixture is subjected to heat and pressure, such as by a drop mill and thus banded. After the mixture is banded, it can be calendared onto a web of fabric to form a finished reinforced sheet or extruded into various continuous forms such as sheets or strips. The process is described as being particularly useful as applied to scrap polyvinyl chloride sheet material reinforced with cotton fabric.

These processes of recycling or reclaiming scrap material, however, are not entirely successful and have not found widespread usage because of economic infeasibility and limitations on the types of article which can be made. Thus, it is among the objects of the invention to provide a process of recycling, reclaiming, and reutilizing scrap material, and particularly thermoplastic scrap material from the manufacture of floor covering or the subsequent removal of the floor covering after installation.

It is another object of the present invention to provide a new floor covering using the recycled and reclaimed scrap material.

SUMMARY OF THE INVENTION

These and other objects and advantages of the present invention are accomplished by a process for recycling waste polymeric material comprising a mixture of waste polymeric material wherein the waste polymeric material includes from about 15 to 50 percent aliphatic polyamide material; granulating the chopped mixture into fragments at least an order of magnitude smaller than the size of the waste polymeric material; and extruding the granulated mixture at a temperature of less than about the temperature at which the largest portion of waste aliphatic polyamide material decomposes. The process of the present invention can be used to make various articles of manufacture.

A floor covering is also provided. The floor covering comprises a carpet having textile fibers defining a fibrous upper outer face and a primary backing to which the textile fibers are secured and a secondary backing permanently adhered to the lower surface of the primary backing, the secondary backing comprising a matrix formed by granulating a coarsely chopped mixture of waste polymer material including 15 to 50 percent aliphatic polyamide material and extruding the granulated mixture at a temperature of less than temperature at which the largest portion of waste aliphatic polyamide material decomposes.

BRIEF DESCRIPTION OF THE DRAWINGS

Some of the objects and advantages of the invention having been stated, other objects will appear as the description proceeds when taken in conjunction with the accompanying drawings in which.

DETAILED DESCRIPTION OF THE PREFERRED EMBODIMENT

While the present invention will be described more fully hereinafter with reference to the accompanying drawings in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
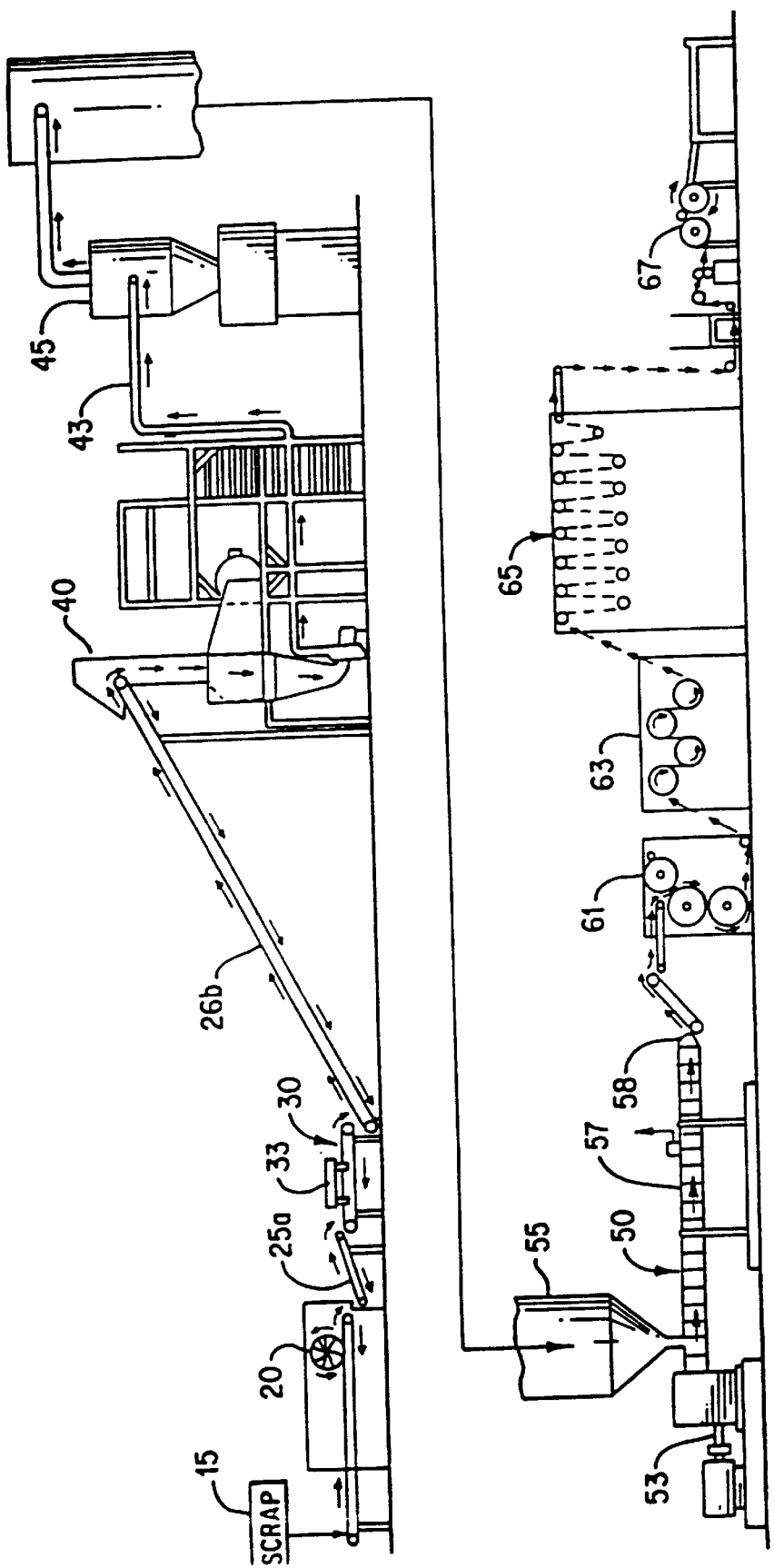
FIG. 1 is a diagrammatic view of the process in accordance with the present invention.

A preferred form of the process is illustrated in FIG. 1 wherein waste polymeric material (scrap) 15 is delivered to a chopper 20. The waste polymeric material typically comprises a wide variety of thermoplastic material generated during the manufacture of floor coverings and generated in the disposal of used floor coverings. Typical thermoplastic materials present include aliphatic polyamides, polyolefins (e.g., polyethylene and polypropylene), polymers based on vinyl monomers (e.g., vinyl chloride and vinyl esters such as vinyl acetate), and blends and copolymers thereof. The aliphatic polyamides must be present in the amount of about 15 to about 50 percent. It is believed that the aliphatic polyamides function as a compatibilizer for the other scrap thermoplastic materials. The term "aliphatic polyamide polymer" used herein and throughout the specification includes any long-chain polymeric or copolymeric amide which has recurring amide groups as an integral part of the main polymer or copolymer chain. Exemplary aliphatic polyamides include nylon 6 or poly (ω-caprolactam); nylon 66 or poly (hexamethylenediamineadipic acid) amide; poly (hexamethylenediamine-sebacic acid) amide or nylon 610; and the like.

The chopper 20 is any conventional chopper that coarsely chops the waste polymer material into ¾ to 1 inch in length portions. A suitable chopper is Model CT-60 available from Pieret, Inc. The chopped mixture is transported, for example, via a conveyer belt 25a to a metal detection station 30. Any foreign metal objects are detected by a metal detector 33 and removed so as to avoid damaging the equipment. The chopped mixture, free of any metal, is transported via conveyer belt 26b to a granulator 40 wherein the chopped mixture is finely granulated into fragments at least an order of magnitude smaller than the original size of waste polymeric material. Typically this is about ⅜ inch and smaller. A suitable granulator is Model 24-1 available from Cumberland Company. The granulated mixture is transported via air in a conduit 43 to a Gaylord loading station 45. If desired fines and dust can be removed and separated from the granulated mixture.

The granulated mixture is conveyed to an extruder 50. A suitable extruder is Model 2DS-K 57M32 or ZSK-170 M 1750 10 G both available from Werner & Pfleiderer. The extruder So includes a control means 53 (e.g., a motor gear box) and a feeder 55. Control means 53 is provided to insure that the extruder 50 and feeder 55 act cooperatively to maintain the disparate materials in a starve fed condition throughout the conveying zone to a zone comprising one or more kneading zones (not shown). The materials then pass through an extruder barrel 57 including a degassing zone and then through a pumping zone which forces the same through a die 58. The pumping zone functions to develop sufficient through-put without creating intolerable back pressures in the preceding zones or on the thrust bearings of the extruder 50. The extruder is operated at a temperature selected to not exceed the temperature at which the largest portion of aliphatic polyamide waste material decomposes. Typically this is about 215° C. The extruded article of manufacture is calendared 61, cooled at a cooling station 63, and accumulated by a accumulator 65 and the article of manufacture rolled up at a collection station 63.

Exemplary articles of manufacture include secondary backings for floor covering, signs, building material, sound barriers, bulkheads, and the like.

Figure 2:
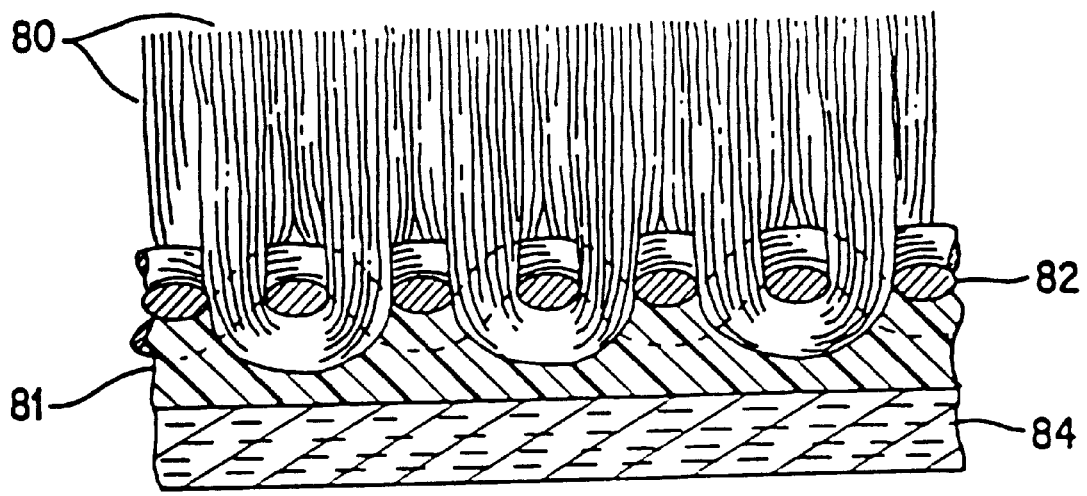
FIG. 2 is an enlarged sectional view of a floor covering in accordance with the present invention.

Referring to FIG. 2, a floor covering (e.g. a pile carpet) utilizing the article of manufacture is illustrated. Tufted pile yarns 80 are looped through a primary backing 82, and extend upwardly therefrom. The backcoating 81 is an adhesive coating that fixes the pile yarns in place in the primary backing. A secondary backing 84 (i.e., the article of manufacture) is then adhered to the backcoating using the backcoating or another adhesive. The primary backing 82 may be formed of natural fibers, such as jute, or of synthetic fibers such as polypropylene, polyethylene, or polyester, for example. As is conventional, the pile yarns 80, may be cut for form cut pile tufts as illustrated in FIG. 2, or may form loops (not illustrated).

The backcoating 81 may be comprised of any suitable polymer compound. Typically the backcoating is comprised of either a polymer emulsion polymerization product or a polymer plastisol compound. The backcoating is cured on the textile material by heating or drying or in any way reacting the backcoating to harden it. An exemplary emulsion polymerization product includes a polyvinylidenechloride or ethylene vinyl copolymer with at least one acrylic monomer. Standard acrylic monomers include, for example, acrylic acid, methacrylic acid, esters of these acids, or acrylonitrile. Alternatively, the backcoating may comprise conventional thermoplastic polymers which are applied to the carpet by hot melt techniques known in the art.

To bond the secondary backing formed from floor covering waste polymer material using the method of the present invention, additional heat is applied to the backcoating. The secondary backing is contacted with the backcoating. The temperature is sufficient to partially melt the contacting surface of the secondary backing thereby bonding the secondary backing to the back coating forming an integral structure such as described in U.S. Pat. Nos. 3,560,284 and 3,695,487 to Wisotzky, the disclosures of which are incorporated herein by reference in their entirety.

The following example is set forth as a further illustration of the present invention and its applications. The various compositions set forth are exemplary and not to be considered as limiting. It will be apparent that many modifications and variations can be effected without departing from the scope of the present invention.

EXAMPLE

The waste, previously used carpet is obtained. The carpet is analyzed for the waste polymeric material present. The following materials are present:

| Material | Melt Point |
|---|---|
| polyethylene | 100–174° C. |
| polypropylene | 150° C. |
| polyvinylchloride | 116–138° C. |
| vinyl copolymers | 80–81° C. |
| nylon 6 | 216° C. |
| nylon 6,6 | 255° C. |

Figure 3:
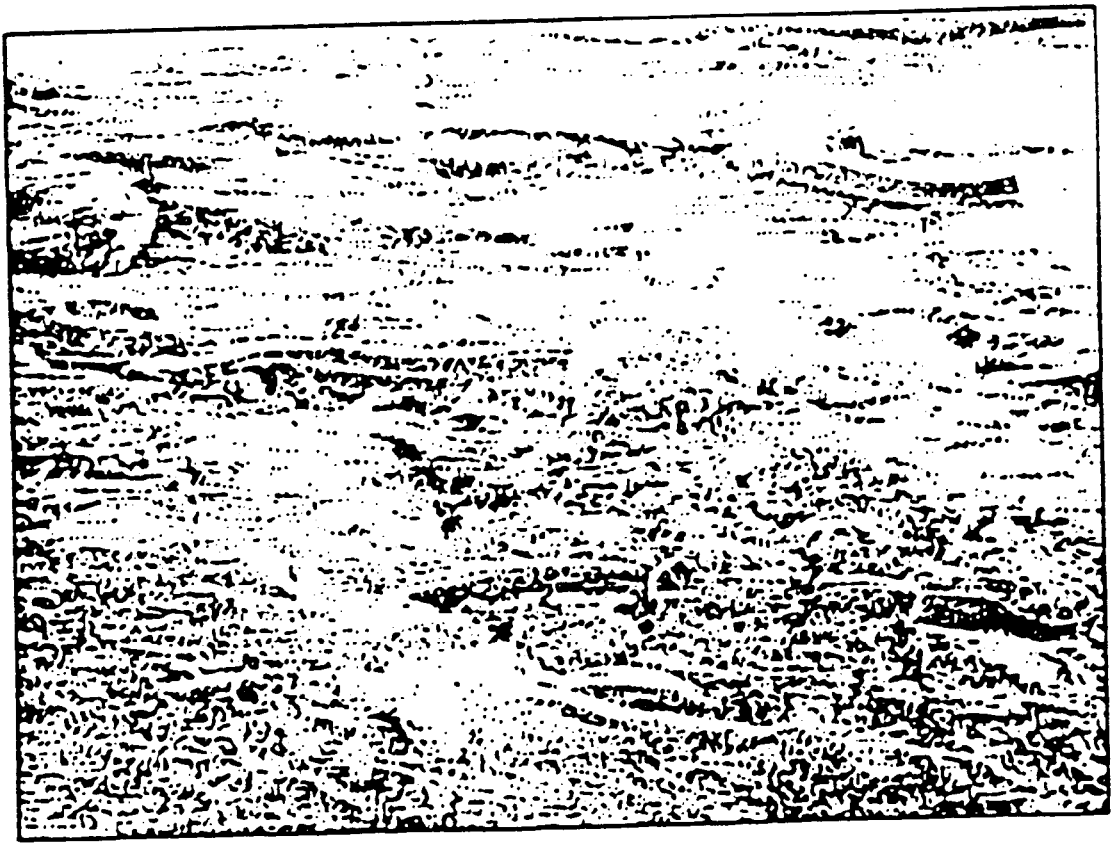
FIG. 3 is a SEM micrograph of an article of manufacture of the Example.

The waste carpet is chopped into fragments of about ¾ to 1 inch. The fragments are then granulated into a granulated mixture having fragments of less than ⅜ inch. The granulated mixture is extruded at a temperature of about 215° C., a pressure of about 120–200 psi and flow rate of about 7–15 thousand pounds per hour. A SEM micrograph of the resulting article is shown in FIG. 3 wherein the edge is cracked from the extruded edge and the view is parallel to the extrusion direction. The orienting of fibers can clearly be seen.

That which is claimed is:

1. A building material consisting of extruded granulated coarsely chopped waste polymer material including 15 to 50 percent aliphatic polyamide material having a predetermined decomposition temperature and the remainder of the waste polymeric material including at least one polymeric material selected from a group consisting of polyethylene, polypropylene, vinyl esters, vinyl chloride and blends and copolymers thereof, the chopped material being extruded at a temperature less than said predetermined decomposition temperature associated with the majority of the aliphatic polyamide material present in said chopped mixture of waste polymer material.

2. A building material comprising an extruded granulated waste polymeric material including 15 to 50 percent aliphatic polyamide material having a predetermined decomposition temperature, the remainder of the waste polymeric material consisting of at least one polymeric material selected from a group consisting of vinyl esters, vinyl chloride and blends and copolymers thereof, the waste polymeric material having been extruded at a temperature less than said predetermined decomposition temperature associated with the majority of the aliphatic polyamide material present in said waste polymer material.

* * * * *